United States Patent [19]
Alpers

[11] 3,728,724
[45] Apr. 17, 1973

[54] ADAPTIVE SWEPT-FREQUENCY ACTIVE RADAR SEEKER

[75] Inventor: Frederick C. Alpers, Riverside, Calif.

[73] Assignee: The United States of America as represented by the Secretary of the Navy

[22] Filed: Feb. 12, 1971

[21] Appl. No.: 115,117

[52] U.S. Cl. .................................................343/7.5
[51] Int. Cl. ...................................................G01s 9/02
[58] Field of Search.........................................343/7.5

[56] References Cited

UNITED STATES PATENTS 3,611,370   10/1971   Frasure et al..........................343/7.5

Primary Examiner—T. H. Tubbesing
Attorney—R. S. Sciascia, G. J. Rubens, J. W. McLaren and T. M Phillips

[57] ABSTRACT

An adaptive swept frequency active radar seeker comprising an antenna, microwave components, and signal processing circuits arranged to provide guidance of a missile against a ship or prominant land target under all weather conditions. Microwave CW transmitter signals of moderate power are generated by one microwave tube. The frequency of the signals is controlled by a swept generator. The microwave signal is passed through a sidewall coupler, where a small portion is bled off for use in synthesizing a local oscillator signal for heterdyne reception. Means are provided to control the swept generator by controlling the sweep rate and by controlling the sweep amplitude.

6 Claims, 3 Drawing Figures

INVENTOR.
FREDERICK C. ALPERS 3,728,724

ADAPTIVE SWEPT-FREQUENCY ACTIVE RADAR SEEKER

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

The present invention provides a swept frequency active radar seeker for guiding a missile toward a ship or boat target under all weather conditions and in sea states up through WMO 5. Prior seekers for this purpose have been pulse type seekers in which a microwave pulse is radiated through an antenna of finite beam width toward the target. Returning echo signals from the target and from the surface of the sea (sea clutter) are heterodyned against a local oscillator signal generated within the seeker. This provides suitable sensitivity to detect echo signals from targets as desired ranges (5 to 25 nautical miles). For conditions of other than a relatively calm sea (WMO 0-2), the sea clutter return, which typically comes from the area very large compared to the dimensions of the target, is frequently so large that it obscures the target signal. This means that in the more frequently encountered sea states of (WMO 3-5) only very large targets will be detectable.

To overcome the limitation imposed by sea clutter, several recent seeker designs have utilized (A) a pulse-to-pulse agility in the frequency of the transmitted pulse, and/or (B) a very short pulse or one that is in effect shortened by pulse compression techniques. The frequency agility increases the signal-to-clutter ratio (typically by 3 to 9 db), while the shortening of the pulse reduces the effective clutter signal in direct proportion to the pulse length. To provide for frequency agility and/or very short pulse operation the new seekers generally use travelling wave amplifiers as transmitting tubes. Travelling wave tubes are relatively large and due to the packaging problem are limited in size to provide only moderate peak transmission powers (5KW). This results in a limitation on the amount of energy that can be transmitted in one pulse when the pulse width is effectively very short, and this limitation, in turn, leads to system complexities if desired detection ranges against other than large targets are to be achieved.

The present invention overcomes the disadvantages of prior known systems by providing an active radar which permits continuous wave rather than pulse signals. By changing the sweep length as a function of range the seeker provides low range resolution at long range and very high resolution at short range. Thus the design is well suited to detect and track large targets at long range where, because of transmitted power and sensitivity limitations, only signals from large targets will be above noise levels. Similarly, at short range the high resolution is near optimum for detecting and tracking small targets amid clutter, and without such resolution the signals from small targets would frequently remain lost among the sea or land clutter signals even though range closure had brought the target signals above noise level. For large targets the high resolution at short range is not disadvantageous since signal strength is well above the marginal level. It uses only one microwave tube, and is intended to operate at a high microwave frequency (e.g., K-band). To make possible the derivation of target range information as well as to provide the equivalent of frequency agility for signal-to-clutter improvement and counter-countermeasure purposes, the continuous wave emission is swept in frequency in a sawtooth manner. In addition this frequency sweep is modified or adapted to optimize the operation for particular target range at any instant.

Accordingly, an object of the invention is to provide an active radar seeker which overcomes the disadvantages of the pulse type radar seeker.

Another object of the invention is to provide a swept frequency active radar seeker which requires only one microwave tube.

Other objects and many of the attendant advantages of this invention will be readily appreciated as the same becomes better understood by reference to the following detailed description when considered in connection with the accompanying drawings wherein.

Figure 1:
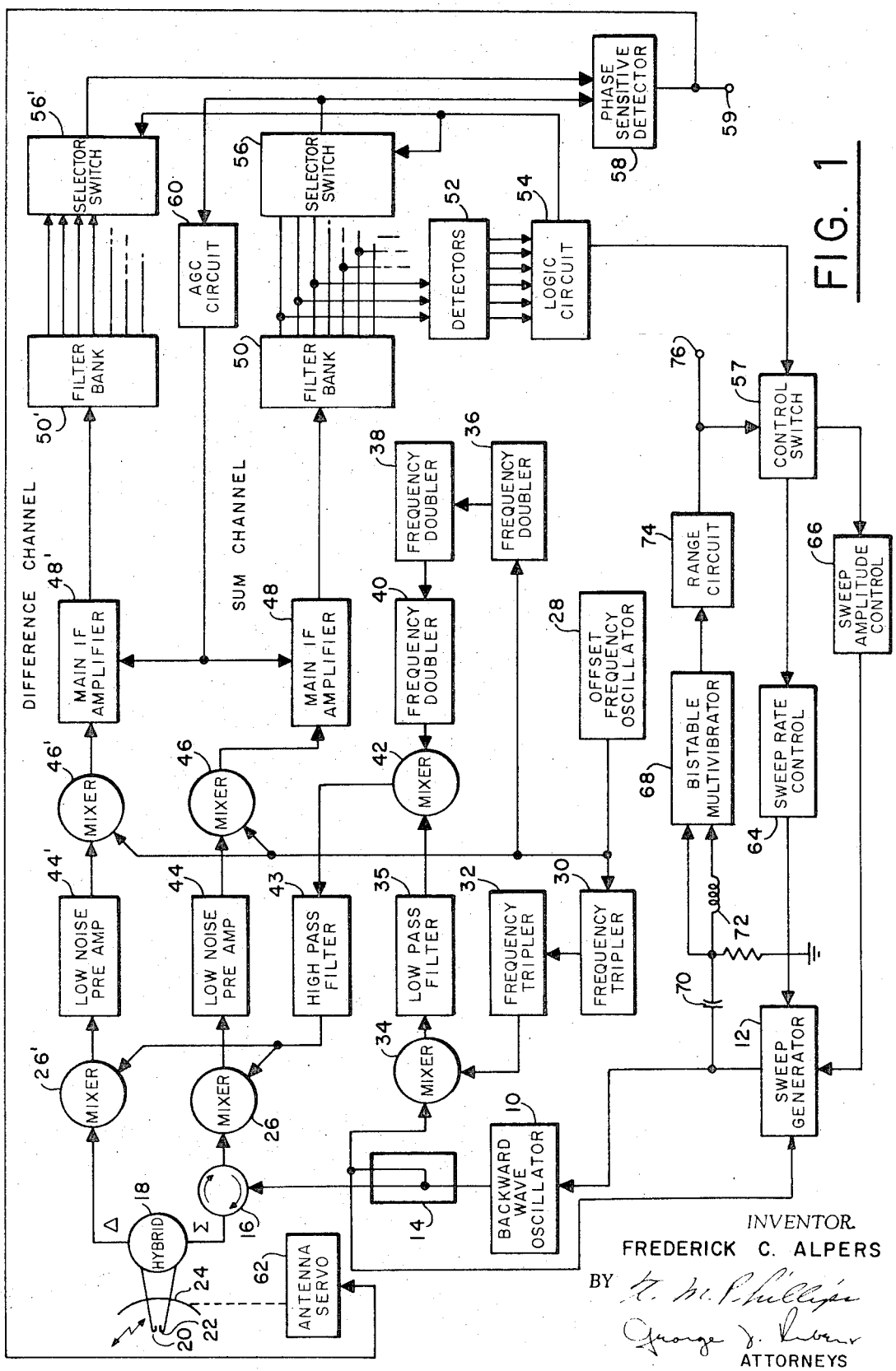
FIG. 1 is a block diagram of a preferred embodiment of the invention.

Referring now to FIG. 1 there is shown a backward wave oscillator 10 with the frequency being controlled by means of the sweep generator 12. The microwave signal out of backward wave oscillator 10 is passed through sidewall coupler 14 where a small portion of the signal is bled off for use in generating a local oscillator signal in a manner to be described below. The primary signal passes through sidewall coupler 14 to a microwave circulator 16 which directs the signal to the sum port of a hybrid junction 18. Hybrid junction 18 splits the signal equally and feeds it to the two feeds 20, 22 of antenna 24, which transmit the signal in the general direction of the target.

A radar echo signal from the target together with signals from clutter and/or extraneous targets, returns to antenna 24. A signal originating from a point along the antenna center line, or axis, enters equally into both antenna feeds 20, 22 and appears as a single signal at the sum port of hybrid 18. A signal from an off-axis reflecting object enters unequally into the two feeds and results in signals in both the sum and difference ports of hybrid 18. By well known radar amplitude monopulse processing theory, for the small off axis angles of interest the relative amplitude of the difference signal is proportional to the angle that the reflecting object lies off the antenna axis, while the in phase or out of phase relationship of the difference to the sum signal is indicative of the off axis direction. To preserve amplitude and phase relationships, the sum and difference signals are processed through essentially identical receiving channels, and a description of the sum signal processing will serve to describe both.

Microwave circulator 16 should be connected so as to pass the sum echo signals to a sum channel mixer 26. At mixer 26 the echo signal is heterodyned against a signal at a frequency that is offset by an intermediate frequency (e.g., 60 Mhz) below the frequency of backward wave oscillator 10 at that particular instant. In this way the signal used for heterodyning is swept in synchronism with the transmitted signal. The heterodyning signal is derived by generating a signal of the desired offset frequency in a separate oscillator 28 and passing this signal through two frequency tripplers 30, 32 to provide a signal having a frequency nine times the desired offset frequency. The bled-off signal from sidewall coupler 14 is beat against the signal that is nine times the offset frequency in mixer 34. The output signal from mixer 34 is passed through a low pass filter 35 and is beat with a signal having a frequency eight times the offset frequency in mixer 42. Eight times the offset frequency is generated by passing the output of frequency generator 28 through frequency doublers 36, 38, and 40. The output from mixer 42 is fed through a high pass filter 43 to mixer 26. Filters 35 and 43 are provided to remove undesired image frequencies so that the desired heterodyning frequency ($f$–60 Mhz) results. The same result might be achieved by beating the offset frequency (60 Mhz) directly against the blead-off signal except that a very high Q-filter would be required for image rejection and the sweep excursion of backward wave oscillator 10 would be severely limited. The output signal from mixer 26 is amplified in a low noise preamplifier 44 to amplify the signal well above noise level. The amplified signal is then mixed with the offset frequency generated by frequency generator 36 within mixer 46 to produce a lower frequency IF signal. The resultant signal is then amplified in main IF amplifier 48 which should have a high gain to amplify the signal up to an amplitude convenient for processing. The signal out of amplifier 48 is fed to a filter bank 50 which has multiple outputs. The individual output of filter bank 50 are fed to detectors 52 where the output of each filter is detected and fed as in input to logic circuit 54. The output of each filter is also connected to the selector switch 56. The output of logic 54 is connected as an input to selector switch 56 and as an input to control switch 57. The output from selector switch 56 is determined by logic circuit 54 which selects the filter having the greatest output. The selected output from selector switch 56 is fed as a first input to phase sensitive detector 58 and as a feedback to main amplifier 48 through automatic gain control circuit 60. The second input to phase sensitive detector 58 is the selected output from selector switch 56'.

The output signal from selector switch 56 is the output of the sum channel and the output from selector switch 56' is the output from the difference channel. The difference signal will be either in phase or out of phase with the sum signal and the phase relationship is determined by phase sensitive detector 58 and will result in either a positive or negative output. The polarity of the signal out of detector 58 indicates whether the source of the selected signal was to the right or to the left of the seeker antenna axis. Since the main IF amplifier 48' in the difference channel is controlled in gain by the same AGC action as the sum signal, the difference signal will be normalized to the same amplitude as the sum signal and the magnitude of the output of phase sensitive detector 58 will be an approximate measure of the angle between the echo signal source and the antenna 24 axis. The output signal from phase sensitive detector 58 as terminal 59 is the yaw information of the radar seeker and is also connected to antenna servo 62 to keep antenna 24 pointed toward the direction from which the selected signal is arriving.

To provide target range information as an output of the radar seeker a range tracking loop is closed through control of sweep generator 12 via filter bank 50 and logic circuit 54. Sweep generator 12 is controlled by a sweep rate control 64 and a sweep amplitude control 66. The control of generator 12 by either sweep rate control 64 or sweep amplitude control 66 is determined by control switch 57 which, in turn, is controlled by the output of logic circuit 54 and the output of a feedback loop from sweep generator 12 in the following manner. The output of sweep generator 12 is coupled to bistable multivibrator 68 through coupling capacitor 70 and through a delay circuit 72 as a second input. The output of bistable multivibrator 68 is fed to range circuit 74 which operates to generate a control signal that is fed to control switch 57 and to range information output terminal 76.

Figure 2:
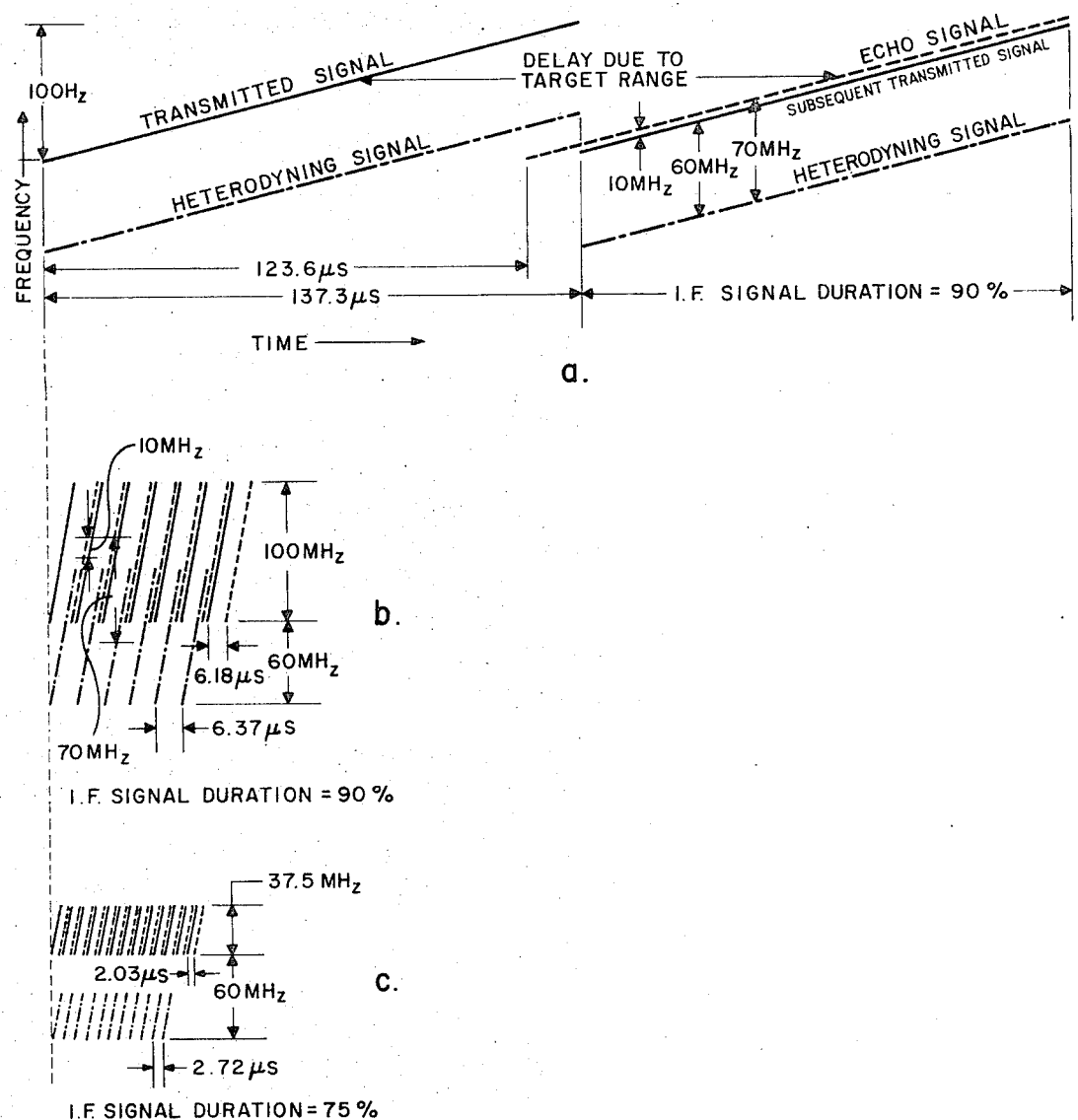
FIG. 2 are graphs of the principal waveforms used in describing the operation of the embodiment of FIG. 1.

The flyback that constitutes the termination of one sawtooth sweep and the start of the next of sweep generator 12 is used to reset bistable multivibrator 68 to an off condition from any action in the preceding cycle. After a very short delay by reactance coil 72 that is equal to the delay between the start of the target echo sweep and that of the succeeding transmitter sweep (see waveforms $b$ and $c$ of FIG. 2), the same flyback signal triggers bistable multivibrator 68 to the on condition which will remain on for the duration of the cycle. The output signal or gate signal from bistable multivibrator 68 is fed to range circuit 74 which may consist of a capacitive charging circuit, a gated discharge circuit, a peak detector and an emitter follower for isolation. While the on gate is present the capacitor charges at a fixed rate and when the on gate is not present the capacitor discharges quickly through the discharge circuitry and is clamped in the discharged condition. The peak detector is connected to register the highest voltage accumulated across the capacitor, which is that at the end of the on gate.

The output from range circuit 74 is then in the form of a voltage that is directly proportional to the duration of each single sweep minus the small delay during which bistable multivibrator 68 is off. At short ranges (less than ½ nautical mile) the range voltage is precisely proportional to range, and closely approximates direct proportionality at longer ranges.

In operation, a radar echo signal from the target, not shown, together with signals from clutter and extraneous targets returns are received at seeker antenna 24. A signal originating from a point along antenna center line or axis enters equally into both antenna feeds 20, 22 and appears as a single signal at the sum port of hybrid 18. A signal from off-axis reflecting object enters unequally into the two feeds and results in signals in both the sum and difference ports of hybrid 18. By well known radar amplitude monopulse processing theory for the small off axis angles of interest the relative amplitude of the difference signal is proportional to the angle that the reflecting object lies off the antenna axis, while the in phase or out of phase relationship of the difference and the sum signal is indicative of the off axis direction. To preserve amplitude and phase relationship the sum difference signals are processed through essentially identical receiving channels labeled "sum channel" and "difference channel." Microwave circulator 16 is connected so as to pass sum echo signals to sum channel mixer 26 rather than to sidewall coupler 14. At mixer 26 the echo signal is heterodyned against a signal at a frequency that is offset by an intermediate frequency, for example, 60 Mhz below the frequency (f) of backward wave oscillator 10 at that particular instant. The signal used for heterodyning (f − 60 Mhz) is swept in synchronism with the transmitted signal. Since the backward wave oscillator signal serves as the transmitted signal, the returning echo signals duplicate the backward wave oscillator signal and are similarly swept in frequency. The echo signals are each displayed by the total transit time to and from the target that applies in their particular case and because of the sweeping action each is therefore offset from the backward wave oscillator frequency at any given instant. This serves to assure that the echo signals are not obscured by leakage of the transmitted signal into the receiver circuit.

The backward wave oscillator sweep rate and total frequency excursions should be selected and made to be adaptable in such a way that the echo signal for the desired target arrives nearly in coincidence with the transmitter sweep immediately following the sweep that produced that particular echo signal. This is illustrated by the waveforms a of FIG. 2. When the sweep period (which establishes delay between successive sweeps) is made such that the target echo signal overlaps 90 percent of the subsequent transmitted sweep interval, and when the sweeps are linear, the target echo signal at any instant will differ in frequency from the subsequent transmitted signal by an amount (10 Mhz) that is 10 percent of the total transmitter frequency sweep (100 Mhz). The given difference (10 Mhz) will hold throughout this subsequent transmitter sweep because with the high sweep repetition frequency (for example, slightly less than 7 Khz), adaptive changes in the sweep waveforms with target range closure will only require very minute changes in waveform form one sweep to the next.

The given difference (10 Mhz) between the target echo and subsequent transmitter frequencies leads to a larger but likewise frequency difference (60 Mhz + 10 Mhz = 70 Mhz) between the echo and heterodyning signal. When the target echo signal and heterodyning signals are mixed in microwave mixer 26 an intermediate (70 Mhz) signal is derived that represents the target echo. This signal is amplified in a low noise preamplifier 44 and is then mixed in mixer 46 with the offset frequency (60 Mhz) which produces a lower frequency (10 Mhz) IF signal. The resultant signal is then amplified in main IF amplifier 48. The bandpass of the sum and difference channels through the main IF amplifier 48, 48' ahould be made wider than the minimum required in order to provide reception of signals from slightly in excess of or less than the anticipated target range. This allows small changes in target range without loss of signal, and also makes it easier to acquire the target signal initially. Signals from objects or clutter that are displaced from the target by significant range increment are not amplified and are rejected. Those signals which are passed sorted in a filter back 50. An echo signal from slightly less than the expected target range will occur at a higher frequency and will emerge from the output of one of the higher turned filters in the back and conversely an echo from a greater range will emerge from a lower tuned filter.

The outputs of the individual filters in filter bank 50 are detected and fed to logic circuit 54. The outputs of the individual filters are also fed to selector switch 56 which acting under control of logic circuit 54 selects the intermediate frequency output signal from only one of the filters and couples this signal to phase sensitive detector 58. The selected output signal from switch 56 also serves as the input signal to automatic gain control circuit 60 for control of main amplifiers 48 and 48'. In the difference receiver channel, which parallels the sum channel from the microwave mixing stage through selector switch 56', the corresponding filter output is selected and becomes the difference signal for direction sensing. As discussed above the difference signal will be either in phase or out of phase with the sum signal and the phase relationship as determined by phase sensitive detector 58 will result in either a positive or negative output. The polarity indicates whether the source of the selected signal lies to the right or left of the seeker antenna axis. Since the main IF amplifier 48' in the difference channel is controlled in gain by the same automatic gain control action as the sum signal, the difference signal will be normalized to the sum amplitude, and the magnitude of the output of the phase sensitive detector 58 will therefore be an approximate measure of the angle between the echo signal source and the antenna axis.

One feature of the invention is the ability to track a target from a maximum range on the order of tens of miles to a minimum tracking range of a few hundred feet. Attempting to hold the sweep amplitude (100 Mhz) constant and yet change and sweep period sufficiently to accommodate this large change in range leads to circuit design difficulties. To avoid these the adaptation of the sweep to target range is implemented by two different techniques that are used in sequence. As the target is tracked from the maximum range into a preselected range of 0.5 nautical miles, the sweep amplitude is held constant and the sweep period is continuously shortened. As illustrated in the waveforms a and b of FIG. 2 this maintains the 90 percent overlap of the target echo signal with the succeeding sweep of the transmitted signal and assures that there is only a 10 percent reduction in obtainable receiver sensitivity due to this particular "self heterodyning" process.

From 0.5 NM to the minimum range, the other technique is used; that is, the sweep rate (volts per microsecond) is held constant and the amplitude of the sweep is reduced. As shown by the waveforms c of FIG. 2, this results in a reduction in the extent of overlap between the target echo and the succeeding transmitter sweep, but the overlap reduction occurs more slowly than the reduction in range, and decreases sensitivity at the short ranges where the strong echo signal tends to saturate the seeker circuits.

Figure 3:
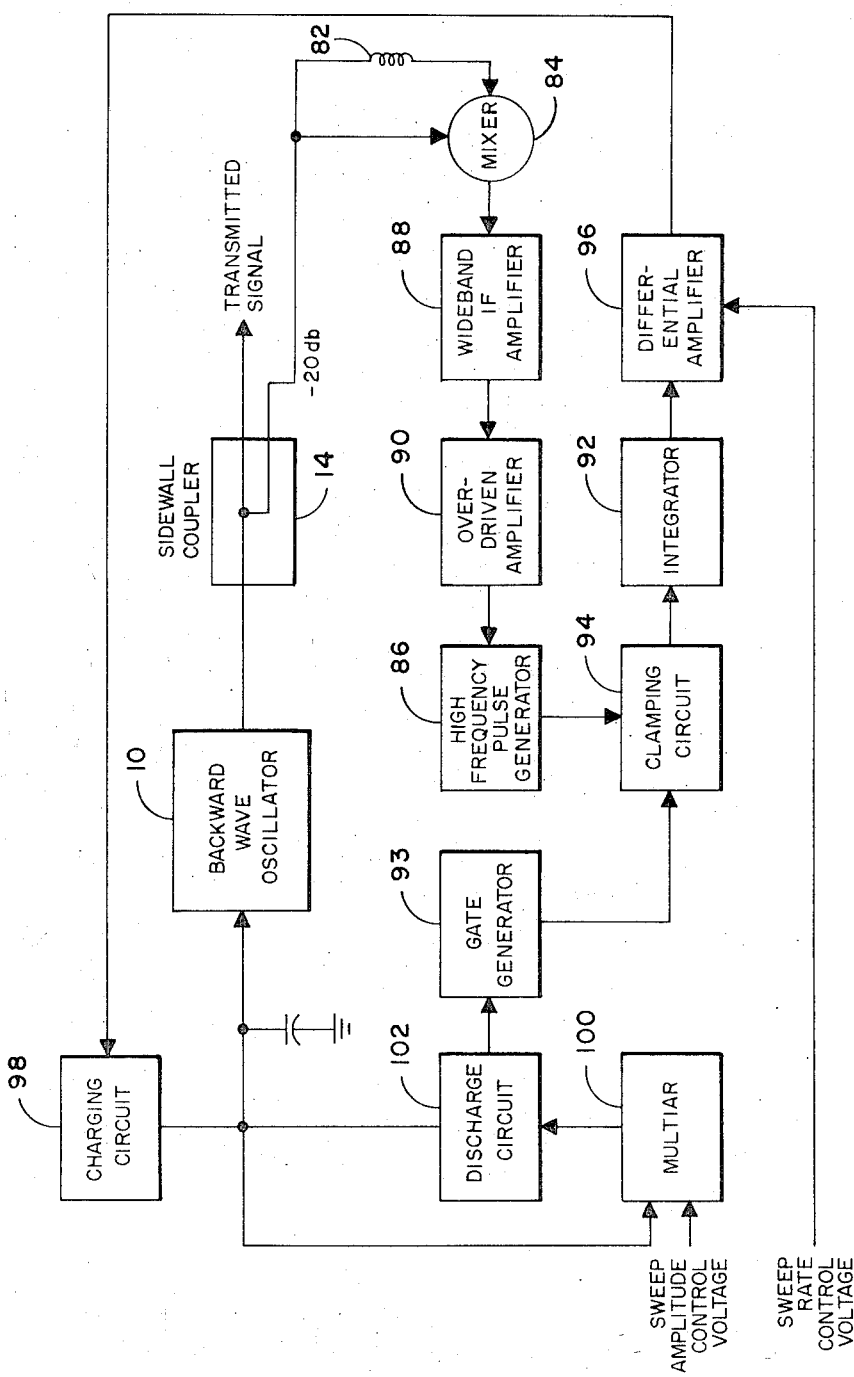
FIG. 3 is a detailed block of a highly linear sweep generator circuit for providing the oscillator control voltage in FIG. 1.

Referring now to FIG. 3 there is shown in detailed block diagram the sweep generator of FIG. 1. The output signal of backward wave oscillator 10 from sidewall coupler 14 is coupled through a short microwave delay line 82 to mixer 84 where it is heterodyned against a later undelayed portion of itself. With delay or delay line 82 very short with respect to the duration of the sweep cycle, and the time constant for changing the backward wave oscillator frequency suitably restricted, the IF signal out of mixer 84 will have a frequency that is essentially directly proportional to the rate of change of frequency of the backward wave oscillator 10 at that instant. This proportionality is used to provide a feedback to control the sweep rate of backward wave oscillator 10 and keep it linear. The feedback is provided via wide band IF amplifier 88, overdriven amplifier 90, high frequency pulse generator 86 and an integrator 92. Overdriven amplifier 90 and pulse generator 86 convert the IF signal out of mixer 84 to a series of short pulses, with one pulse generated for each cycle of the IF signal. Integrator 92 converts the pulses to a DC voltage with the level of the DC directly dependent upon the number of pulses per unit of time. To guard against errors occasioned by the fly-back portion of the sweep cycle, a gate generator 93 and clamping circuit 94 are inserted to disrupt any charging or decay of integrator 92 during this period. The DC signal out of integrator 92 is connected to a differential amplifier 96 where it is compared with the sweep rate control voltage from sweep rate control 64. Any difference in these two voltages is fed as a correction voltage to charging circuit 98. Since the control signal out of charging circuit 98 relates directly to the rate of change of backward wave oscillator frequency rather than of the sweep voltage, small changes in the voltage-frequency transfer characteristics of the backward wave oscillator, as well as small deviations in linearity from one portion of the transfer curve to another, are cancelled out by the control process. To control sweep amplitude, multiar circuit 100 is used to trigger the sweep discharge circuit 102. Multiar 100 compares the instantaneous sweet voltage from charging circuit 98 to the sweep amplitude control voltage from sweep amplitude control 66 that represents the desired amplitude, and when the former voltage attains an amplitude equal to the latter, a pulse is generated to initiate a new sweep.

Obviously many modifications and variations of the present invention are possible in the light of the above teachings. It is therefore to be understood that within practiced scope of the appended claims the invention may be practice otherwise than as specifically described.

What is claimed is:

1. In an active radar seeker, the combination comprising:
    a. a microwave energy generating means for generating continuour wave microwave energy,
    b. transmitting circuit means and receiving circuit means coupled to said microwave energy generating means for transmitting microwave energy in the direction of a target to be detected and for receiving microwave energy reflected from the target to be detected,
    c. an offset frequency oscillator for generating a desired offset frequency signal,
    d. two frequency tripler circuits connected in series and to said offset oscillator for providing an output signal nine times the offset frequency signal,
    e. a first mixer circuit coupled to the output of said frequency triplers and to said microwave energy generating means for generating a first intermediate frequency,
    f. three frequency doubler circuit connected in series and to said offset oscillator for providing an output signal eight times the offset frequency signal,
    g. a second mixer circuit coupled to the output of said frequency doubler circuits and to the output of said first mixer circuit for providing a heterodyning signal at the desired offset frequency to said transmitting and receiving circuit means,
    h. a sweep generator coupled to said microwave energy generating means for controlling the output frequency of said microwave energy,
    i. circuit control means coupled to said sweep generator and to said transmitting and receiving circuit means and being responsive to a measure of the distance to the target reflecting the transmitted energy for controlling the amplitude and frequency of the sweep generator output voltage.

2. The active radar of claim 1 wherein said transmitting and receiving circuit means include;
    a. a dual feed antenna,
    b. a sum channel and a difference channel, said sum and difference channels being coupled to said dual feed antennas by means of a hybrid junction whereby the sum of the signals received by the dual feed will be fed to said sun channel and difference in the signals received by the channel feed will be fed to said difference channel,
    c. a filter bank being coupled to the output of said sum channel for providing a plurality of output signals whose amplitudes vary over a range dependent on the frequencies of the signal fed through said sum channel,
    d. a filter back being coupled to the output of said difference channel for providing a plurality of output signals whose amplitudes vary over a range dependent on the frequencies of the signals fed through said difference channel.

3. The active radar of claim 2 wherein a logic circuit means is coupled to the outputs of the filter banks of said sum and difference channels and being responsive to the strongest signal from said sum channel for selecting the strongest output signal from each of said channels.

4. The system of claim 3 wherein said circuit control means includes,
    control switch means coupled to said logic circuit and to said sweep generator for coupling a corrective signal being responsive to the selected signal from said sum channel for adding a corrective sweep rate control voltage to said sweep generator when the target is at ranges longer than a predetermined range and coupling corrective sweep amplitude control voltages to said sweep generator when the target is at ranges shorter than said predetermined range.

5. The system of claim 3 wherein a phase sensitive detection means is coupled to the outputs of said sun and difference channels and being responsive to the amplitude of the selected difference signal and the relative phase of the selected sum and difference signals for providing an output voltage representing directional information of the target with respect to the transmitting and receiving antenna.

6. In an active radar seeker, the combination comprising:

a. a microwave energy generating means for generating continuous wave microwave energy, b. transmitting circuit means and receiving circuit means coupled to said microwave energy generating means for transmitting microwave energy in the direction of a target to be detected and for receiving microwave energy reflected from the target to be detected, c. a mixer having a first input coupled directly to the output of said microwave energy generating means and a second input coupled through a short delay line to the output of said microwave energy generating means for generating an intermediate frequency signal whose instantaneous frequency is proportional to the change in frequency of the microwave energy generating means during the preceding interval of the duration of the delay introduced by the delay line, d. pulse generating means coupled to the output of said mixer for generating one pulse for each cycle of the intermediate frequency signal, e. integrator circuit means for converting the pulse to a direct current voltage whose amplitude is directly proportional to the number of pulses per unit of time, f. a source of sweep rate control voltage, g. a source of sweep amplitude control voltage coupled to said integrator circuit means, h. differential amplifier means having a first input coupled to said integrator circuit means, a second input coupled to said source of sweep rate control voltage and having an output coupled to said microwave energy generating means for adjusting the sweep rate in accordance with the direct current voltage output of said differential amplifier means.

* * * * *